United States Patent
Moscatelli et al.

(10) Patent No.: US 10,029,800 B2
(45) Date of Patent: Jul. 24, 2018

(54) HEAT RECOVERY SYSTEM, IN PARTICULAR FOR USE ON AIRCRAFT, USING A TWO-PHASE FLUID CIRCUIT

(71) Applicant: FINMECCANICA—Società per azioni, Rome (IT)

(72) Inventors: Antonio Moscatelli, Turin (IT); Gianni Mancuso, Turin (IT)

(73) Assignee: Leonardo S.p.A. (IT)

( * ) Notice: Subject to any disclaimer, the term of this patent is extended or adjusted under 35 U.S.C. 154(b) by 0 days.

(21) Appl. No.: 15/159,605

(22) Filed: May 19, 2016

(65) Prior Publication Data

US 2016/0340047 A1    Nov. 24, 2016

(30) Foreign Application Priority Data

May 21, 2015    (IT) .............................. 1020150016666

(51) Int. Cl.
  *F28D 15/00*    (2006.01)
  *B64D 13/08*    (2006.01)
  (Continued)

(52) U.S. Cl.
  CPC .......... *B64D 13/08* (2013.01); *F28D 15/0266* (2013.01); *B64D 15/02* (2013.01);
  (Continued)

(58) Field of Classification Search
  CPC ........ B64D 13/08; B64D 15/02; B64D 37/34; B64D 2013/0607; B64D 2013/0648;
  (Continued)

(56) References Cited

U.S. PATENT DOCUMENTS

| 4,516,631 A | 5/1985 | Russell |
| 2006/0185825 A1 | 8/2006 | Chen et al. |

(Continued)

FOREIGN PATENT DOCUMENTS

| CA | 2217972 A1 | 4/1999 |
| CN | 101590913 A | 12/2009 |

(Continued)

OTHER PUBLICATIONS

Italian Search Report dated Dec. 4. 2015.
Italian Written Opinion dated May 21, 2015.

*Primary Examiner* — Davis Hwu
(74) *Attorney, Agent, or Firm* — Waller Lansden Dortch & Davis, LLP; Matthew C. Cox

(57) ABSTRACT

The system comprises at least one evaporator device arranged around a tube inside which a hot fluid flows and, for each evaporator device, a respective conduit connected at its opposite ends to the evaporator device so as to form with the latter a closed circuit containing a two-phase fluid. Each evaporator device comprises a casing, having an inner wall in contact with the respective tube and an outer wall enclosing a cavity with the inner wall, and a separating member of porous material arranged inside the casing so as to divide radially the cavity into an inner cavity, extending between the inner wall and the separating member, and an outer cavity extending between the separating member and the outer wall. Each conduit is in fluid communication at its opposite ends with the inner cavity and with the outer cavity, respectively, of the respective evaporator device so as to allow fluid in vapor phase to flow out from the evaporator device and the fluid in liquid phase to flow back into the evaporator device, respectively.

5 Claims, 2 Drawing Sheets

(51) Int. Cl.
*F28D 15/02* (2006.01)
*B64D 15/02* (2006.01)
*B64D 37/34* (2006.01)
*B64D 13/06* (2006.01)

(52) U.S. Cl.
CPC ...... *B64D 37/34* (2013.01); *B64D 2013/0607* (2013.01); *B64D 2013/0648* (2013.01); *B64D 2013/0674* (2013.01); *Y02T 50/56* (2013.01)

(58) Field of Classification Search
CPC ........... B64D 2013/0674; F28D 15/043; F28D 15/0266; F01K 15/02
USPC .................................................... 165/104.26
See application file for complete search history.

(56) References Cited

U.S. PATENT DOCUMENTS

| | | | |
|---|---|---|---|
| 2012/0168111 A1* | 7/2012 | Soukhojak | F28D 15/043 165/10 |
| 2015/0198380 A1* | 7/2015 | Haj-Hariri | B64G 1/50 62/3.2 |
| 2016/0214462 A1* | 7/2016 | Zhou | F01K 15/02 |

FOREIGN PATENT DOCUMENTS

| | | |
|---|---|---|
| EP | 0469825 A2 | 2/1992 |
| EP | 2792437 A1 | 10/2014 |
| WO | 2014102402 A1 | 7/2014 |

\* cited by examiner

HEAT RECOVERY SYSTEM, IN PARTICULAR FOR USE ON AIRCRAFT, USING A TWO-PHASE FLUID CIRCUIT

BACKGROUND OF THE INVENTION

The present invention relates in general to a heat recovery system using a two-phase fluid circuit. More particularly, the present invention relates to a heat recovery system for recovering the heat extracted from the air drawn from a high-temperature compression stage of the engine.

In military and civil aircrafts the air-conditioning system uses typically as an air source the air drawn from a compression stage of the engine operating at a high temperature (in the region of 500-600° C.). This air, before being sent to the user appliances of the aircraft air-conditioning system, must be cooled by heat exchange with dynamic air supplied from the external environment. For this purpose, according to the prior art, it is envisaged using a primary heat exchanger, commonly known as a precooler, through which the heat extracted from the hot air drawn from the engine compressor is discharged into the external environment, without therefore being recovered.

U.S. Pat. No. 4,516,631 describes a cooling system, intended in particular for cooling a nozzle for supplying fuel or air to a combustion chamber, using a so-called "heat pipe". According to this known solution, the cooling system comprises an evaporator device which is arranged around the nozzle and is connected by means of a duct to a tank containing a two-phase fluid, the evaporator device, the duct and the tank forming together a closed circuit. The evaporator device comprises a casing having an inner cylindrical wall in contact with the wall of the nozzle and an outer cylindrical wall which encloses, together with the inner cylindrical wall, a cavity. A dividing wall is arranged between the inner wall and the outer wall of the casing of the evaporator device, said dividing wall being formed as a metal cylinder which is perforated along at least one section of its length and dividing radially the cavity into an inner cavity extending between the inner wall and the dividing wall and into an outer cavity extending between the dividing wall and the outer wall. An element of porous material which extends between the inner wall and the outer wall of the casing is placed at one end of the cavity. The operating principle of this known cooling system is as follows. The working fluid in liquid phase supplied from the tank enters into the evaporator in an axial end zone of the outer cavity and flows axially along this cavity until it reaches the element of porous material. The working fluid, still in liquid phase, then passes from the outer cavity to the inner cavity, flowing by capillarity through the element of porous material. The working fluid then flows axially along the inner cavity, receiving heat from the nozzle and therefore passing from the liquid phase to the vapour phase. Along the last section of the inner cavity the working fluid in vapour phase releases heat to the outside through a finned heat dissipator arranged around the inner cavity and then flows out the evaporator in liquid phase and back into the tank.

The cooling system known from document U.S. Pat. No. 4,516,631 does not have the function of recovering heat from the nozzle so as to allow use of the recovered heat for given purposes, for example for heating the fuel or for de-icing function, but simply serves to extract heat from the nozzle in order to cool said nozzle, dispersing the extracted heat into the external environment. Moreover, this known system is extremely inefficient, because of the head losses which occur both in the flow along the outer cavity and in the flow along the inner cavity, and also because the fluid in vapour phase which flows along the inner cavity from the end where the element of porous material is placed to the opposite end inevitably releases heat to the fluid in liquid phase which flows in the opposite direction along the outer cavity. Because of its low efficiency, it would not be possible to employ such a system in order to use advantageously, even at a distance of several meters from the nozzle, the heat recovered from the nozzle.

SUMMARY OF THE INVENTION

It is an object of the present invention to provide a system which is able to recover heat from a hot fluid flowing in at least one tube, in particular from the hot air drawn from the compressor of an aircraft engine, which does not have a primary heat exchanger (precooler), thus reducing the volume, mass and complexity of the aircraft air-conditioning system, and which is particularly efficient.

This and other objects are fully achieved according to the present invention by means of a heat recovery system as claimed herein.

In brief, the invention is based on the concept of recovering heat from a hot fluid flowing in a tube, in particular from the hot air drawn from the compressor of an aircraft engine, using a two-phase fluid circuit comprising at least one evaporator device associated with one of the hot air tubes along which the hot air drawn from the engine compressor flows, the evaporator device comprising a casing arranged around a respective hot air tube and a separating member of porous material arranged inside the casing so as to divide radially the inside of the casing into an inner cavity, facing towards the hot air tube, and an outer cavity, facing towards the outside, allowing the fluid to flow radially by capillarity through the separating member from the outer cavity to the inner cavity, the two-phase fluid circuit further comprising, for each evaporator device, a conduit which is connected with its opposite ends to the evaporator device so as to define therewith a closed circuit through which a two-phase fluid flows. In this way, the fluid in liquid phase which is inside the inner cavity of the evaporator device receives heat from the hot air flowing along the hot air tube and evaporates. The fluid in vapour phase flows along the conduit and can therefore be used with a heating function, for example for heating the fuel, or with a de-icing function, for heating parts of the aircraft where formation of ice is to be avoided. The fluid in liquid phase which returns via the conduit to the evaporator device is pushed radially by capillarity through the separating member in the direction from the outer cavity to the inner cavity of the evaporator device, where the transition from liquid phase to vapour phase again takes place owing to the heat released by the hot air flowing in the tube.

It is thus possible to establish, without the need for active flow control devices, a circulation of fluid along the conduit of the two-phase fluid circuit which allows transfer, where required, for example to the fuel tanks or to the aircraft wings, of the heat extracted from the hot air supplied by the engine compressor. By means of the heat recovery system according to the present invention, it is therefore possible to use, for example for fuel heating function or de-icing function, the heat extracted from the hot air supplied by the engine compressor, which heat would otherwise be discharged into the external environment.

Moreover, since the hot air drawn from the engine compressor releases heat to the evaporator devices arranged along the tube(s) through which the hot air flows, the hot air may be cooled down to the desired temperature without having to use a primary heat exchanger (precooler), thus reducing the volume, mass and complexity of the aircraft air-conditioning system.

Furthermore, using a two-phase fluid circuit allows to recover heat as well as to use the heat thus recovered, in a passive and automatic manner, without the need for active flow control devices and therefore without energy consumption. Basically, the present invention provides a simple, low-cost and extremely reliable solution for improving the overall energy efficiency of the aircraft.

BRIEF DESCRIPTION OF THE DRAWINGS

Further characteristics and advantages of the present invention will appear more clearly from the following detailed description, given purely by way of a non-limiting example, with reference to the accompanying drawings in which.

DETAILED DESCRIPTION OF PREFERRED EMBODIMENTS

Figure 1:
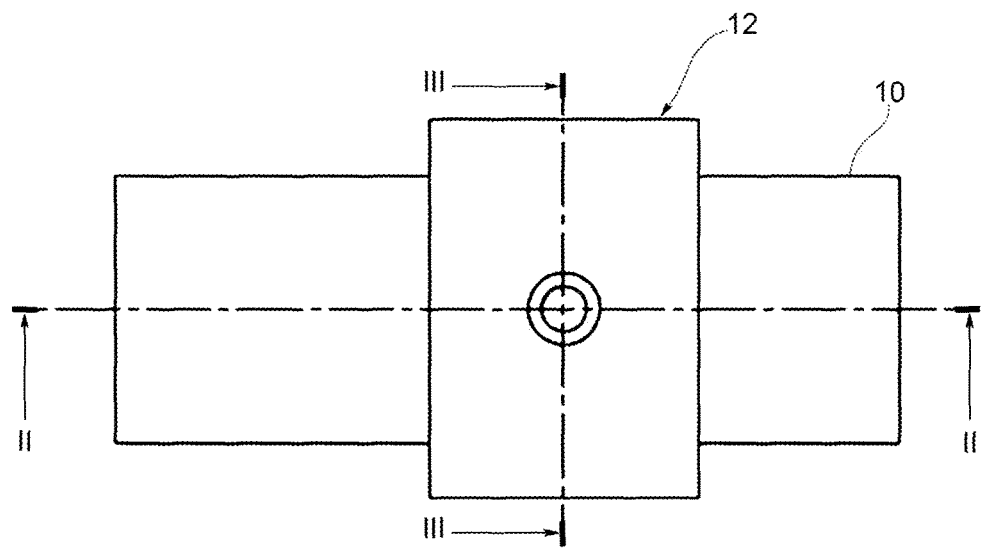
FIG. 1 shows a side view of a section of the hot air tube on which an evaporator device forming part of a heat recovery system according to the present invention is mounted.
Figure 2:
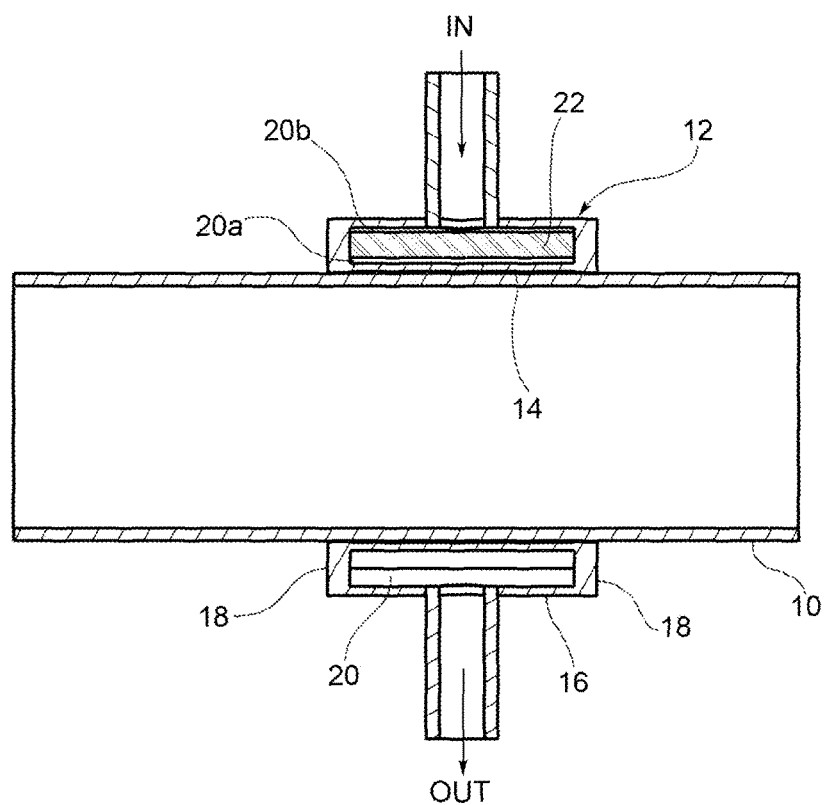
FIG. 2 is an axial-section view through section line II-II of FIG. 1.

With reference first to FIGS. 1 to 3, 10 denotes a hot air tube (only a section of which is shown) through which the hot air drawn from a high-temperature compression stage of an aircraft engine (not shown, but in any case of per-se-known type) flows to be used, after being cooled down to the desired temperature, in an aircraft air-conditioning system. An evaporator device 12 forming part of a heat recovery system according to the present invention is mounted on the hot air tube 10 (hereinafter simply referred to as "tube"). The evaporator device 12 comprises a sleeve-like casing having an inner wall 14, an outer wall 16 and a pair of end walls 18 which close the sleeve at its opposite axial ends and define, together with the inner wall 14 and the outer wall 16, a cavity 20. The inner wall 14 of the evaporator device 12 is in contact with the wall of the tube 10. Preferably, the inner wall 14 and the outer wall 16 of the evaporator device 12 are cylindrical walls arranged coaxially with each other, as well as coaxially with the tube 10.

Figure 3:
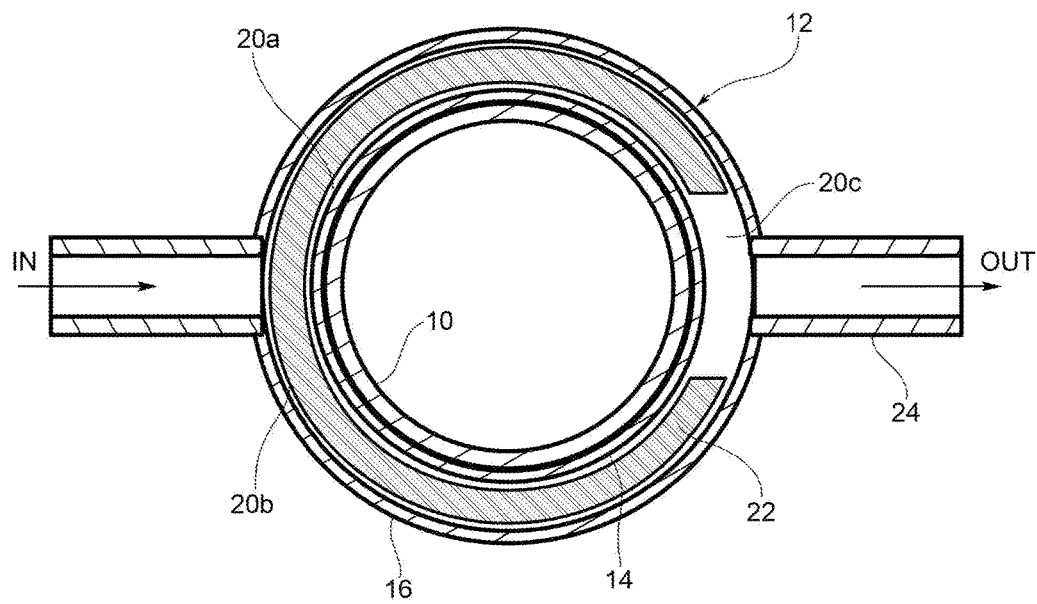
FIG. 3 is a cross-section view through section line of FIG. 1.

A separating member 22 of porous material is arranged inside the evaporator device 12, between the inner wall 14 and the outer wall 16, so as to divide radially the cavity 20 into an inner cavity 20a, extending between the inner wall 14 and the separating member 22, and an outer cavity 20b, extending between the separating member 22 and the outer wall 16. The separating member 22 extends over the entire length (axial dimension) of the cavity 20, while it is interrupted in the circumferential direction so as to connect the inner cavity 20a and the outer cavity 20b with each other in a zone of the cavity 20 indicated 20c (FIG. 3). The separating member 22 is therefore formed as a tubular element with an axial slit (i.e. a slit extending parallel to its axis, coinciding with the axis of the casing of the evaporator device 12).

The heat recovery system further comprises a conduit 24 which is connected at its opposite ends to the evaporator device 12 so as to form with the latter a closed circuit which is filled with a two-phase fluid (such as water, ammonia or propylene). More specifically, the conduit 24 is connected to the evaporator device 12 on one side in the zone 20c of the cavity 20 and on the other side along the outer cavity 20b, preferably on the diametrically opposite side to the zone 20c.

The heat recovery system operates as follows. The fluid in liquid phase which is inside the inner cavity 20a of the evaporator device 12 receives heat from the hot air flowing along the tube 10 and evaporates. The fluid in vapour phase flows out of the evaporator device 12 in the zone 20c of the cavity 20 (as indicated by the arrow OUT in FIGS. 2 and 3) and along the conduit 24 to transfer heat to one or more user appliances served by the heat recovery system. The recovered heat may be used, for example, for heating the fuel or for de-icing purposes, i.e. for heating parts of the aircraft, such as in particular the wings, where formation of ice must be avoided. The fluid then returns in liquid form to the evaporator device 12, namely to the region of the outer cavity 20b (as indicated by the arrow IN in FIGS. 2 and 3) and from here is pushed radially by capillarity through the separating member 22 into the inner cavity 20a, where transition from liquid phase to vapour phase again occurs owing to the heat released by the hot air which flows along the tube 10. A continuous fluid flow is thus established along the conduit 24, which allows the heat extracted from the hot air flowing in the tube 10 to be transferred wherever required, for example to the fuel tanks or to the wings of the aircraft.

Figure 4:
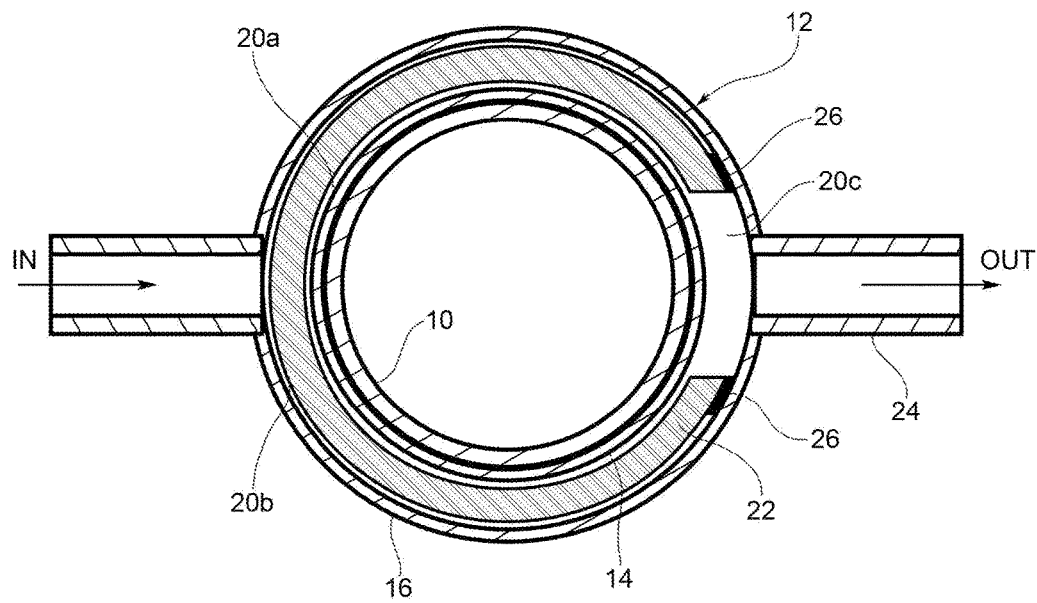
FIG. 4 is a cross-section view, similar to that of FIG. 3, showing a variant of embodiment of the present invention.

With reference now to FIG. 4, in which parts and elements identical or corresponding to those of the preceding figures have been given the same reference numerals, according to a variant of embodiment of the present invention the inner cavity 20a and the outer cavity 20b are not connected with each other in the zone 20c of the cavity 20, but communicate with each other only via the pores of the separating member 22. In this case also, as in the embodiment of FIGS. 1-3, the separating member 22 is interrupted in the circumferential direction (i.e. is formed in the manner of a tubular sleeve having an axial slit) so as to put the inner cavity 20a into communication with the conduit 24. However, differently from the embodiment of FIGS. 1-3, the passage between the outer cavity 20b and the zone 20c of the cavity 20 is closed by closure elements 26, preferably arranged at the free ends of the separating member 22. In this way, therefore, the fluid in liquid phase which is in the outer cavity 20b is forced to flow towards the inner cavity 20a passing through the separating member 22.

Even though the attached drawings show only a single evaporator device, several evaporator devices might clearly be provided on the same hot air tube, each evaporator device being connected to a respective conduit so as to form with the latter a respective closed circuit containing the two-phase fluid. Moreover, in the case where several hot air tubes are provided, the heat recovery system will advantageously comprise at least one evaporator device arranged on each of the hot air tubes.

Finally, even though the invention has been described here with particular reference to its application on aircrafts, in particular in combination with a hot air tube which supplies the air-conditioning system of the aircraft with hot air drawn from a high-temperature compression stage of the aircraft engine, in general it may be applied to any system in which the heat carried by a hot fluid flowing in a tube would otherwise be discharged into the external environment, without being at least partially recovered.

Naturally, the principle of the invention remaining unchanged, the embodiments and the constructional details may vary widely from those described and illustrated purely by way of non-limiting example.

What is claimed is:

1. A heat recovery system for recovering heat from a hot fluid flowing in at least one tube, in particular from hot air drawn from a high-temperature compression stage of an aircraft engine, the system comprising at least one evaporator device arranged around said at least one tube and, for each evaporator device, a respective conduit connected at its opposite ends to the evaporator device so as to form with the latter a closed circuit containing a two-phase fluid, wherein each evaporator device comprises a casing, having an inner wall in contact with the respective tube and an outer wall enclosing a cavity with the inner wall, and a separating member arranged inside the casing so as to divide radially the cavity into an inner cavity, extending between the inner wall and the separating member, and an outer cavity, extending between the separating member and the outer wall, the separating member being made of porous material so as to allow the fluid to flow radially by capillarity through the separating member in the direction from the outer cavity to the inner cavity, wherein the inner wall and the outer wall of each evaporator device are cylindrical walls arranged coaxially with each other and coaxially with the respective tube, wherein the separating member of each evaporator device extends over the entire length of the cavity and is interrupted circumferentially in a connection zone of the cavity, and wherein each conduit is in fluid communication at its opposite ends with the inner cavity and the outer cavity, respectively, of the respective evaporator device so as to allow fluid in vapour phase to flow out of the evaporator device and fluid in liquid phase to flow back into the evaporator device, respectively.

2. The system of claim 1, wherein the separating member of each evaporator device is formed as a tubular element having an axial slit.

3. The system of claim 1, wherein each conduit is connected to the respective evaporator device at one end in the connection zone of the cavity and at the opposite end along the outer cavity, on the diametrically opposite side to the connection zone.

4. The system of claim 1, wherein the outer cavity of each evaporator device is in direct fluid communication with the connection zone of the cavity.

5. The system of claim 1, wherein each evaporator device comprises closure means arranged between the separating member and the outer wall so as to prevent direct fluid communication between the outer cavity and the connection zone of the cavity.

* * * * *